Jan. 25, 1966    H. G. TURNER    3,230,709
CONTROL SYSTEMS FOR LIQUID-FUEL SUPPLY
Original Filed Sept. 12, 1962
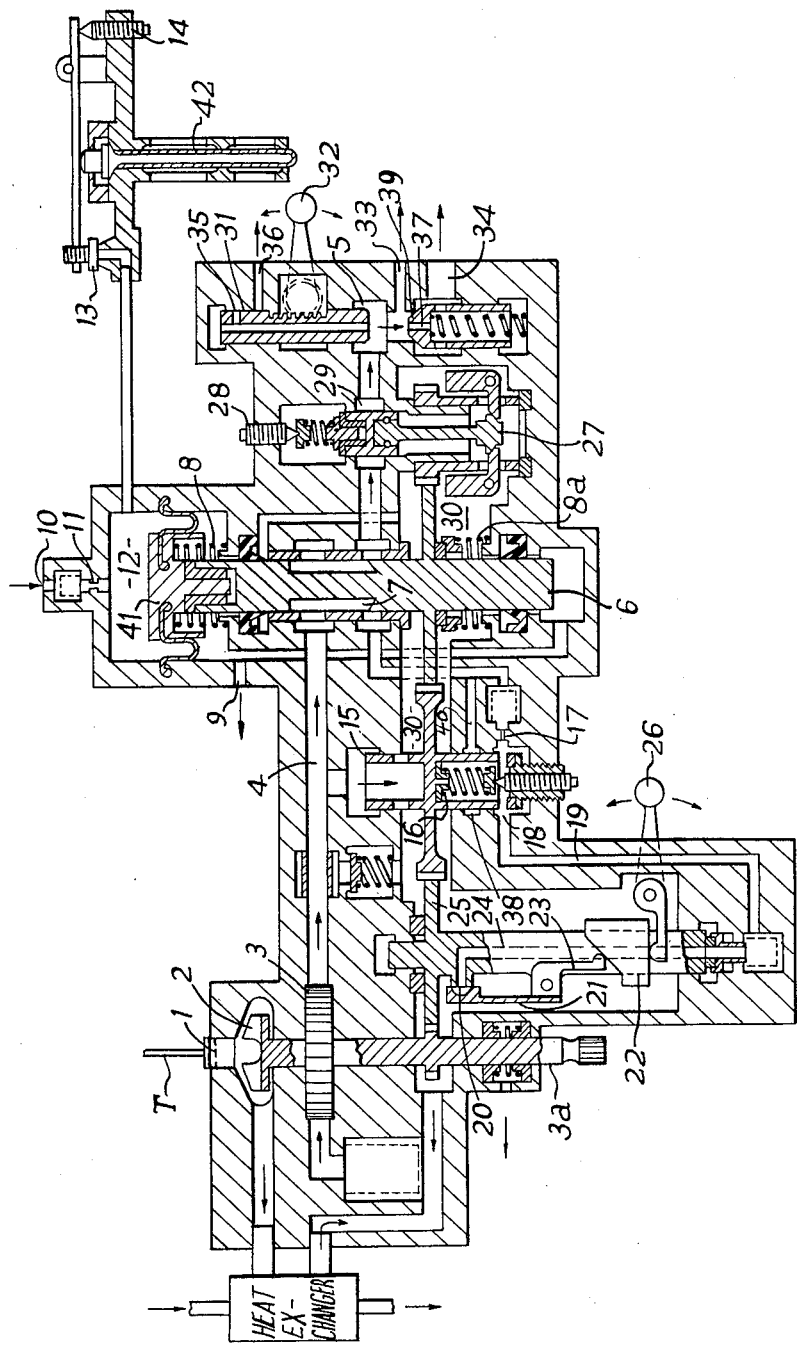

3,230,709
CONTROL SYSTEMS FOR LIQUID-FUEL SUPPLY
Horace G. Turner, Chandler's Ford, England, assignor to The Plessey Company Limited, Ilford, England, a British company
Continuation of application Ser. No. 223,597, Sept. 12, 1962. This application Jan. 13, 1965, Ser. No. 425,245
Claims priority, application Great Britain, Sept. 14, 1961, 32,948/61
1 Claim. (Cl. 60—39.28)

The present application is a continuation of my application Serial No. 223,597, now abandoned. The invention relates to control systems for liquid-fuel supply of the kind in which the fuel suply line contains a variable aperture controlled by one or more conditions of operation of the engine, the fuel being supplied to the variable aperture by a positive-displacement pump with the interposition of a pressure limiting spill device. The invention has for an object to provide a control system of the kind specified with an improved spill device which, under certain operating conditions, will maintain the pressure drop across the variable aperture constant but causes it to decrease under other operating conditions.

More specifically the invention is concerned with a spill device constructed as a differential-pressure valve having a piston-type valve element which is longitudinally movable along a cylinder bore to control a main spill port facing the piston between the two ends thereof, and which is acted-upon in the opening direction by the pressure upstream of the variable aperture and in the closing direction by the composite action of a spring and of the pressure in a control chamber which communicates through a restricted orifice with the fuel passage downstream of the variable aperture, said chamber also communicating with a pilot spill orifice which is controlled by a valve element in accordance with the said operating condition of the engine so as to be closed when the engine operates under conditions in which a constant pressure drop is desired to prevail across the variable aperture and is opened to produce a pressure drop in the said restriction when the engine operates under conditions in which the pressure drop is required to be less than the said predetermined value.

It will be appreciated by those skilled in the art that, in order to obtain accurate fuel control, it is essential that the valve piston should move freely in its bore since its accurate position determines the distribution of the total amount of fuel delivered by the pump between the spill aperture and the supply to the engine burners, but that on the other hand leakage from the pilot chamber to the spill port must be kept at a minimum in view of the small amount of the total flow through the pilot chamber under the said operating conditions. Any undesired leakage from the pilot chamber would under such conditions greatly affect the operativeness of the pilot chamber, and it is a more specific object of the present invention to minimise leakage along the piston from the pilot chamber while maintaining maximum freedom of piston movement.

The invention is illustrated by way of example in the drawing accompanying the specification which is a somewhat diagrammatical elevation of the fuel system for a jet engine.

The illustrated fuel system includes a variable aperture mainly controlled by the pressure difference between engine compressor delivery and compressor inlet pressures, and in which the pressure difference across the variable aperture is arranged to be decreased when the engine reaches a preset speed.

Referring now to the drawing, fuel from a tank connection T enters at 1 into a centrifugal backing pump 2, which feeds it to a positive-displacement pump shown as a gear pump 3 whose shaft 3a is driven by the engine to which the fuel is to be supplied. The pump 3 delivers the fuel at a rate proportional to engine speed into a high-pressure line 4. Flow from the high-pressure line 4 to the burner-feed line 5 is controlled by a throttle-type metering valve element 6. This valve element has ports 7 so shaped as to form an aperture that varies in area according to the position of the valve element. The valve element 6 is urged towards the closed or zero-area position by a spring 8, which is assisted by the compressor inlet pressure admitted at 9 to one end of the valve element and opposed by compressor delivery pressure which is admitted at 10 to a chamber 12, via a restricted orifice 11, to act on a larger-area piston means constituted by a diaphragm head 41 at the other end of the valve element 6. The pressure in chamber 12 is therefore normally equal to compressor delivery pressure, but a vent valve 13, controlled by a temperature-responsive element 42 exposed to the jet-pipe temperature, is arranged to vent the chamber 12 to reduce its pressure when the jet pipe temperature rises beyond a value which may be preset by adjusting a screw 14.

The pressure drop at the ports 7 is normally maintained constant by means of a sleeve-type spill valve 15 which is acted-upon in the opening direction by the pressure in pump-delivery line 4 against the action of a spring 16, the latter being assisted by the pressure downstream of the ports 7, which is admitted via a restrictor orifice 17 to a chamber 18 at one end of the valve. A branch duct 19 leads from the chamber 18 to a half-ball governor valve 20, which is held on its seat by a spring blade 21. This spring blade is adjustably preloaded by a cam 22 and follower 23. Centrifugal force—due to rotation of the governor shaft 24 as it is driven by gearing 25 from the engine-driven shaft 3a of the gear pump 3— will lift the half-ball valve 20 against the spring action of the blade 21 and allow liquid to spill from line 19 when the engine speed reaches a predetermined value, which can be preset by means of an engine-speed control lever 26 acting on the cam 22.

The gearing 25 is also arranged to rotate the spill-valve sleeve 15 and the metering valve element 6 about their respective axes, thus reducing their resistance to axial movement.

As illustrated the equipment also contains an overspeed governor 27. At a maximum speed, which may be adjustable by means of a screw 28, this overspeed governor moves a slide 29 to allow fuel from the burner feed line 5 to spill back to a valve-housing chamber 30 which communicates with the inlet of the positive-displacement pump 3. The burner-feed line 5 further contains a shut-off valve or cock 31 operable by a lever 32 for movement into a position in which it blocks the path of the fuel to prevent access to two ducts 33 and 34 which respectively lead to a pilot burner and main burners, at the same time moving a branch passage 35 into communication with a dump aperture 36, thereby allowing pressure in ducts 33 and 34 to disappear instantly. Finally a pressurising valve 39 normally restricts the flow to the main burners by causing it to flow through a narrow orifice 37. When sufficient pressure is built up in passage 5, the pressurising valve 39 is moved off its seat to allow substantially unrestricted access of the fuel flow to the main burner connection 34.

When there has been wear leakage flow from chamber 18 along the outer surface of the spill valve 15 to the low-pressure chamber 30 may, because of the interposition of the restricted orifice 17 between the downstream side of the variable aperture 7 and the chamber 18, i.e. the chamber whose pressure tends to move the valve 15 to a non-spill position during acceleration or idling, when the half-ball valve 20 is closed, reduce the pressure in chamber 18 considerably below the pressure downstream of aperture 7, and as a result valve 15 may open excessively thereby reducing the pressure drop across aperture 7 and thus the amount of fuel supplied to the engine burners. More particularly under idling conditions this may lead to the engine being severely starved of fuel with consequent risk that the engine may stall. In order to reduce the risk of such excessive opening of the valve 15, an annular chamber 38 is, according to a feature of the invention, arranged to surround the outer surface of the slide valve 15 between the chamber 18 and the low-pressure chamber 30 and is connected to the downstream side of the aperture 7, by an unrestricted passage 40. As long as the valve 20 is closed, this annular chamber is under the same pressure as chamber 18 and therefore will prevent any escape of liquid from the chamber 18 along the outer surface of the slide 15 and thus any drop of the pressure in chamber 18 below that at the downstream side of the aperture 7.

During steady normal running of the engine the valve 20 is partly open, and as a result the pressure in chamber 18 is slightly lower than that in annular chamber 38, so that a small amount of liquid may pass along the sleeve 15 from annular chamber 38 to chamber 18, but the amount of this liquid will generally be insignificant compared with the amount of liquid spilled through valve 20 so that the small extra quantity of liquid entering from chamber 38 does not under these conditions appreciably increase the pressure in chamber 18, more particularly since the pressure difference between chambers 38 and 18 is only small. While protection against fuel starvation under idling conditions could also be obtained if the chamber 38 communicated with the upstream side instead of the downstream side of the aperture 7, the arrangement described and illustrated is more effective inasmuch as leakage will not lead to any falsification of the adjustment of valve 15 under idling and acceleration conditions and as during normal running at constant speed the resultant falsification is greatly reduced so as to be practically insignificant.

What I claim is:

In a hydraulic system including a positive displacement pump having a delivery outlet, and a variable throttle valve connected to said outlet, the combination comprising a spill valve connected to said outlet upstream of the throttle valve, said spill valve including a body formed with a cylinder bore having a spill port intermediate its ends, a slide-valve element fitting in said bore and longitudinally slidable therein between two positions to control said spill port, said element including a piston portion having a cylindrical surface of an axial length greater than the distance between said positions, means for continuously rotating said slide-valve element, restricted passage means in said body connecting one end of said cylinder bore with the pump delivery outlet downstream of said throttle valve, further passage means establishing communication between the other end of said cylinder bore and said outlet upstream of the throttle valve, spring means opposing the action of said upstream pressure on said element, a variable outlet communicating with said one end of the bore, said element and spill port being so constructed as to reduce the opening of said spill port when the pressure drop in said throttle valve falls below a preset value, an annular chamber in the surface of the cylinder bore so arranged between said spill port and said one end of the bore as to communicate with said cylindrical surface irrespective of such movement of the piston, and passage means maintaining said annular chamber in communication with the delivery outlet between said throttle valve and said restricted passage means.

References Cited by the Examiner

UNITED STATES PATENTS

| | | | |
|---|---|---|---|
| 2,643,513 | 6/1953 | Lee | 60—39.28 |
| 2,827,852 | 3/1958 | Links | 103—42 X |
| 3,085,397 | 4/1963 | Jubb | 60—39.28 |
| 3,095,702 | 7/1963 | Brown | 60—39.28 |
| 3,115,750 | 12/1963 | Cowles | 60—39.28 |

JULIUS E. WEST, *Primary Examiner.*

SAMUEL LEVINE, *Examiner.*

M. NEWMAN, *Assistant Examiner.*